(No Model.)
C. J. & H. C. HUBBELL.
PRIMARY BATTERY.
No. 597,239. Patented Jan. 11, 1898.
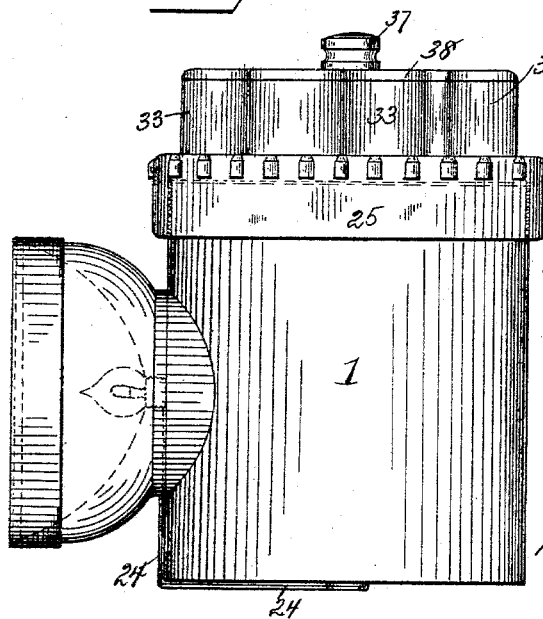
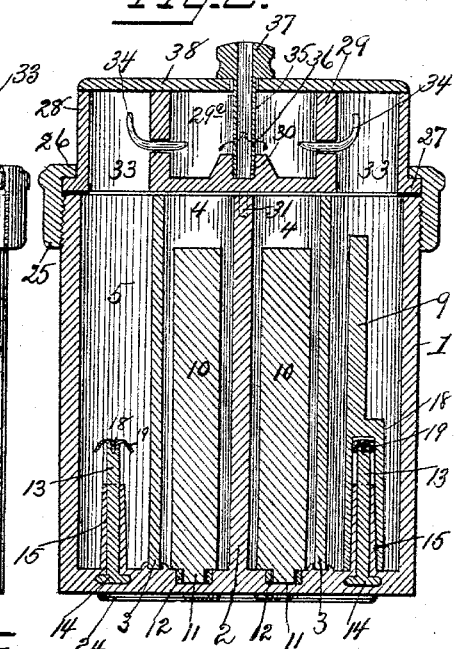
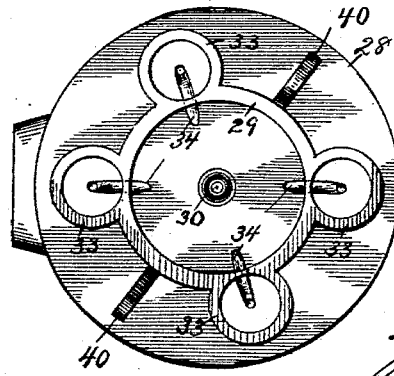
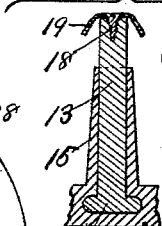
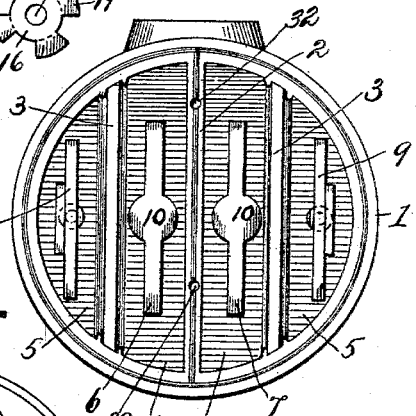
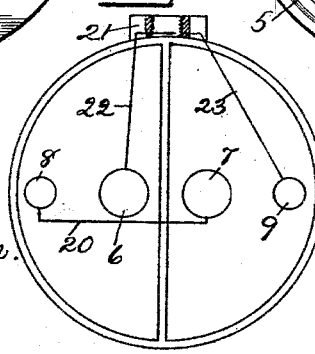
WITNESSES.
Albert Popkins.
Carrie L. Acher.
INVENTORS
Charles J. Hubbell and
Harry C. Hubbell.
By Jas. L. Skidmore,
Attorney.

UNITED STATES PATENT OFFICE.

CHARLES J. HUBBELL AND HARRY C. HUBBELL, OF SCRANTON, PENNSYLVANIA, ASSIGNORS TO THE HUBBELL ELECTRIC LAMP COMPANY, OF SAME PLACE.

PRIMARY BATTERY.

SPECIFICATION forming part of Letters Patent No. 597,239, dated January 11, 1898.

Application filed May 8, 1897. Serial No. 635,698. (No model.)

*To all whom it may concern:*

Be it known that we, CHARLES J. HUBBELL and HARRY C. HUBBELL, citizens of the United States, residing at Scranton, in the county of Lackawanna and State of Pennsylvania, have invented certain new and useful Improvements in Primary Batteries; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to primary batteries, the object being to provide an improved construction of battery adapted especially for use in combination with an incandescent lamp for bicycles and like vehicles.

The characteristic features of our invention include improved means for supporting and securing the battery elements within their cell or casing, means for permitting the escape of noxious gases generated by the battery fluid, novel devices for securing the cap or cover of the battery, and various details of construction hereinafter fully described, and illustrated in the accompanying drawings, in which—

Figure 1 is a side elevation of a battery embodying our invention. Fig. 2 is a central vertical section of the same. Fig. 3 is a plan view of the battery with cap-plate removed. Fig. 4 is a plan view with the entire cover removed. Fig. 5 is a diagrammatic view illustrating the electrical connections between the battery elements and the lamp-socket, and Fig. 6 illustrates in detail one of the posts or supports for the positive elements of the battery.

The casing or cell of the battery (indicated by the numeral 1) is preferably made of celluloid and may be of cylindrical or other shape. By employing celluloid as the material for the casing or cell we are enabled to produce a very light structure which may be made in different colors of any desired ornamentation.

The cell is divided by a transverse central partition 2 into two compartments, each of which is subdivided by a partition 3 into two compartments 4 and 5. Within each of the compartments 4 is located a carbon plate 6 and 7, and within the outer compartment 5 the zinc elements 8 and 9 are arranged.

The carbon plates 6 and 7, constituting the negative elements of the battery, are preferably of the cross-sectional construction shown in Fig. 4, having the central vertical cylindrical enlargement 10, the lower ends of which, Fig. 2, terminate in lugs 11, reduced circumferentially and depending below the lower edge of the plates and fitting within metallic rings, collars, or thimbles 12, seated and sealed in any suitable manner within sockets formed in the bottom of the cell.

Each of the zinc elements 8 and 9 is provided with a central vertical opening adapted to receive a support consisting of a post 13, preferably of phosphor-bronze, and having at its lower end a head or enlarged base 14, embedded in the bottom of the cell and protected by an insulating-covering 15, extending part way of the height of the post. At the upper end of each of the posts 13 is secured a metallic disk 16, having a central screw-hole 17 to receive a set-screw 18 for securing the disk to the post.

A plurality of radial wings 19 project from the periphery of the disk 16, and said wings are bent downwardly, as shown in Figs. 2 and 6, and are of sufficient resiliency to serve as spring-fingers to engage the inner walls of the openings in the zinc element to retain the latter firmly in place upon the posts. This is a feature of importance in that the zinc plates are prevented from wabbling upon their supports, which movement would cause breaks in the circuit, resulting in flickering of the lamp. By sustaining the plates by means of the spring fingers or wings 19 I am enabled to insure a perfect contact and a steady light, even when the machine to which the battery and lamp are attached is passing over rough or uneven ground. A further result of thus supporting the zinc elements is that when the latter are forced down over the yielding spring-fingers 19 air-spaces are formed between the upper end of the post and the walls of the recess in the zinc, which serve to insulate the post and prevent local action at the point of contact.

The opposing elements 7 and 8 are connected by a wire conductor 20, while the elements 6 and 9 are connected, respectively, to opposing contacts in the lamp-socket 21 by conductors 22 and 23. These several conductors are incased within ribs 24, projecting from the bottom and front side of the cell.

The upper end of the cell 1 is externally screw-threaded to be engaged by an internally-threaded clamping-ring 25, having at its upper edge an inwardly-extending annular flange 26, which overlaps the edge 27 of a top or cover 28.

29 indicates a circular ring or flange rising from the top 28 to form a chamber 29$^a$, and 30 is an internally-threaded socket located centrally within the ring 29. Two or more pins 31 depend from the under side of the cover-plate to enter corresponding openings 32 in the top edge of the central partition 2 of the cell, and thus guide and center the cover-plate upon the cell.

From the outer side of the ring 29 of the cover-plate a plurality of tubular casings 33 extend radially, the plate 28 being formed with openings which aline with the tubular casings, so that the latter are in open communication at their lower ends with the interior of the cell. We have shown four of these chambers or casings 33, one for each of the compartments of the cell, and when the cover-plate is in its proper position upon the casing one of the chambers 33 will be over each of the said cell-compartments. From each of the chambers 33 a tube 34 extends through the ring 29 into the central chamber 29$^a$, said tubes being contracted at their ends and having their ends within the chambers 33 bent upwardly. The purpose of this arrangement of the tubes is to prevent any appreciable escape of the battery liquid through said tubes to the central chamber 29$^a$, but permitting the escape through said tubes of gases which rise in the chambers 33. The gases escape from the chamber 29$^a$ through a tube 35, having lateral vents 36, the lower end of the tube 35 being externally threaded to enter the threaded socket 30 of the cover-plate, while its upper end is provided with a knob 37, which bears upon a centrally-bored cap-plate 38, covering the several chambers 29$^a$ and 33. This cap-plate 38 is scalloped or indented to conform to the contour of the chambers which it closes.

The numeral 40 indicates lugs rising from the plate 28 to serve as finger-pieces, by means of which the cover may be conveniently lifted on and off.

It will be obvious that by the construction described we provide for the free escape of the noxious gases arising from the battery fluid, at the same time preventing the fluid from being spilled by any jolting or agitation of the battery.

Having thus described our invention, what we claim, and desire to secure by Letters Patent, is—

1. In a primary battery, a negative element having a central vertical cylindrical enlargement provided at its lower end with a depending lug, in combination with a metallic ring or thimble surrounding said lug.

2. In a primary battery, the hollow plates or elements, a support for said plates or elements, comprising a metallic post secured within the battery-cell, and provided with spring-fingers for engaging the inside of the element.

3. In a primary battery, a support for the plates or elements, comprising a metallic post provided at its upper end with a metallic disk having radial wings or fingers.

4. In a primary battery, an element support or holder comprising a post provided with an enlarged base, and having at its upper end radially-projecting spring-fingers.

5. The combination with a battery-cell, of a cover divided into a series of chambers, consisting of a central chamber communicating with the atmosphere, and a plurality of chambers radially arranged with relation to the central chamber and communicating with the interior of the cell, means for securing the cover upon the cell, and communications between said radial chambers and the central chamber.

6. The combination with a battery cell or casing, of a removable cover divided into a central chamber opening to the atmosphere, and a series of radial gas-escape chambers communicating with the interior of the cell, a cap-plate for said cover, and means for securing the cover and cap-plate in position.

7. The combination with a battery cell or casing, of a removable cover divided into a central gas-chamber opening to the atmosphere, and a series of supplemental gas-escape chambers, the latter communicating with the interior of the cell, means for permitting the escape of gases through said supplemental chambers to the central chamber, and an escape-vent for the latter.

8. The combination with the cell or casing, of a removable cover divided into a central chamber communicating with the atmosphere and a series of supplemental gas-escape chambers communicating with the interior of the cell, communications between said supplemental chambers and central chamber, a clamping-ring for securing the cover upon the cell, and a cap-plate closing the upper ends of said chambers.

9. The combination with the cell or casing, of a removable cover divided into a central chamber opening to the atmosphere and a series of supplemental radially-arranged chambers communicating with the interior of the cell, communications between said supplemental chambers and central chamber, comprising contracted tubes the outer ends of which are bent upwardly within the supplemental chambers.

10. The combination with the cover comprising a central chamber opening to the atmosphere and supplemental gas-escape chambers communicating with the interior of the cell, of conduits connecting the latter with the former, a cap-plate for closing the upper ends of said chambers, and means for securing the cap-plate comprising a gas-escape tube and a knob or finger-piece.

11. The combination with a cell or casing divided into separate compartments, of a removable cover divided into a central gas-escape chamber opening to the atmosphere, and a plurality of supplemental radially-disposed gas-chambers, one communicating with each compartment of the cell, means for conducting the gases to the central chamber of the cover, and an escape-vent for said central chamber.

In testimony whereof we affix our signatures in presence of two witnesses.

CHARLES J. HUBBELL.
HARRY C. HUBBELL.

Witnesses:
L. M. GATES,
WM. D. BOYER.